Oct. 23, 1962 H. I. SWANSON 3,060,298

ELECTRIC HEATER SYSTEMS

Filed Nov. 2, 1959

*INVENTOR.*
HILMER I. SWANSON

*BY* Grover A. Frater
ATTORNEY

United States Patent Office 3,060,298
Patented Oct. 23, 1962

3,060,298
ELECTRIC HEATER SYSTEMS

Hilmer I. Swanson, Davenport, Iowa, assignor to The Bendix Corporation, a corporation of Delaware
Filed Nov. 2, 1959, Ser. No. 850,402
3 Claims. (Cl. 219—20)

This invention relates to improved electric heater systems.

An object of the invention is to provide a heater which has heat output increasing automatically as temperature decreases, has high efficiency at all temperatures, includes means to prevent over-heating, and can be manufactured at minimum cost.

Another object is to provide an improved automatic heating system which occupies minimum space, has minimum weight and is easily repaired commensurate with the requirements for aircraft applications. Miniaturization of components and use of transistors in electronic apparatus has solved some weight and space problems. Unfortunately many of the new components vary widely in effectiveness with temperature change and many of them become inoperative at frigid temperatures. The problem then is to heat these components without nullifying the weight and space advantage and the invention substantially solves that problem.

Other objects and advantages of the invention will hereinafter appear.

Figure 1:
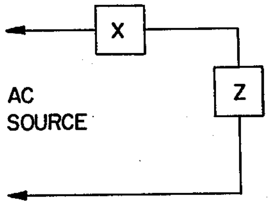
FIGS. 1 and 2 are diagrammatic illustrations of systems embodying the invention.

As illustrated in FIG. 1, the invention contemplates employment of an electrical impedance element Z whose impedance varies materially with temperature and which includes, as an impedance factor, substantial resistance. The impedance element Z is connected in series circuit with a reactive impedance element X whose reactance is opposite in sign to any reactance included in Z but which may be either capacitive or inductive reactance if Z is substantially only resistive. Electrical power applied to such a circuit is dissipated as heat in the impedance element Z and the quantity of heat dissipated is variable with temperature.

Figure 3:
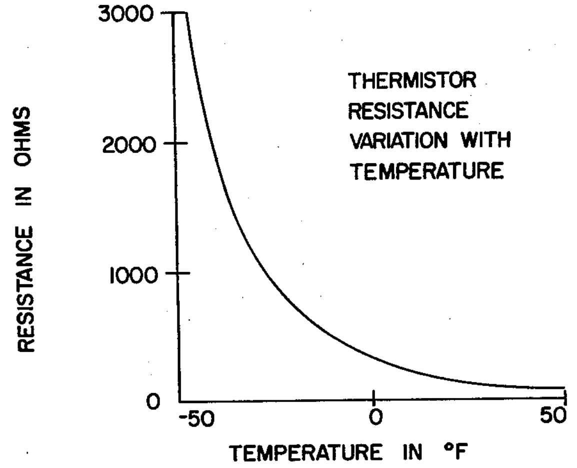
FIGS. 3 and 4 are graphs illustrating the relation between temperature and electrical behavior of the system shown in FIG. 2.

A practical and available impedance element of this character is the thermistor and the variation with temperature in the resistance of a typical thermistor is illustrated graphically in FIG. 3. Used alone, in connection across a fixed voltage source of electrical power, the thermistor would be heated. Its resistance would be lowered permitting increased current flow and consequent additional heating would result until the device was destroyed. Addition of current limiting series resistance would prevent this result but would greatly reduce the variation in power dissipation with temperature change. Certainly such an arrangement would operate to accomplish heating and would be useful to heat apparatus in frigid environments but if such apparatus was moved to a warm environment, heating would not only continue but would be increased, thereby creating an additional and possibly more serious problem. To overcome this difficulty, bimetal operated switches could be employed but only at the expense of possible difficulty with radio frequency interference and contactor sticking as switch contacts were actuated, together with continuous recycling in certain temperature ranges and a variety of other problems.

The invention provides means for limiting thermistor current in a way that inverts temperature response whereby heating is reduced as temperature is increased thus eliminating the need for auxiliary protective apparatus.

Figure 2:
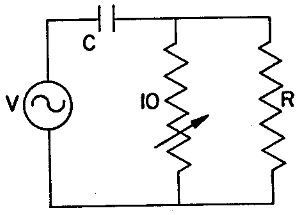

In FIG. 2 there is shown a thermistor 10 connected in parallel with a shunt resistor R. This parallel combination is connected in series with a capacitor C across an electrical power source V. The resistor R is included to limit the maximum power dissipated in the thermistor; as temperature is reduced and thermistor resistance increases, more current flows through the reactive element and, being reactive, it limits current without dissipating power. For ease in analysis of circuit operation, the reactor C is considered to be part of the power source. It is well known that maximum power is delivered to the load, here 10 and R, when the impedance of the load equals the impedance of the source. It is also true that this principle remains unchanged whether the source impedance is resistive or reactive. In other words, maximum power is dissipated in the thermistor-shunt resistor combination when the absolute magnitude of their impedance is equal to the absolute magnitude of the source impedance.

Therefore, if it is desired that maximum power be dissipated in the load at a selected temperature, then the thermistor resistance is determined for that temperature. That being known, the resistance of shunt resistor R and the reactance of reactor C is selected so that the reactance of C is equal to the effective resistance of the thermistor and shunt resistor combination at that temperature. At higher temperatures thermistor resistance is lowered, less power is dissipated in the thermistor-shunt resistance combination and less, not more, heating results.

Figure 4:
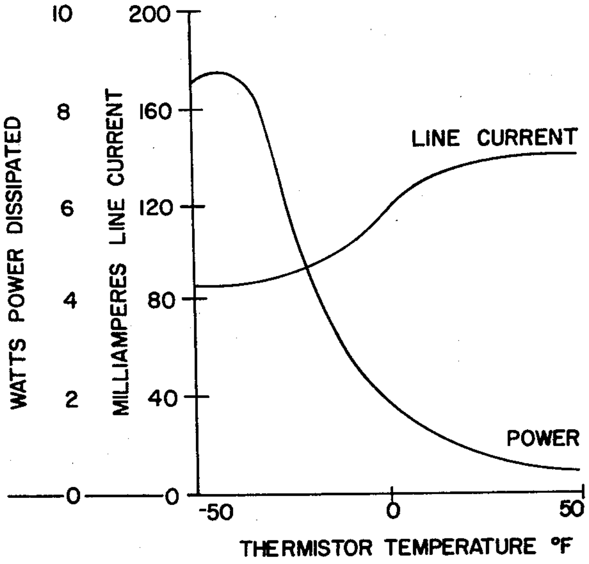

This is illustrated in FIG. 4 which shows the variations in line current and power dissipated in the circuit of FIG. 2. If the power source presents 110 volts at 60 c.p.s., capacitor C has capacity in the amount of 0.5 microfarad, resistor R has 1200 ohms resistance and the thermistor 10 has the characteristic shown in FIG. 3 or about 1000 ohms resistance at −30° F. In this arrangement, the reactive impedance and load impedance are equal at about −30° and power dissipated is maximum at this temperature. The line current curve shows the combined in-phase and out-of-phase currents. Power decreases rapidly as temperature increases and is negligible at room temperature and higher temperatures.

If it is known that temperature will not fall below some given value, the reactive impedance can be made equal to the resistance that the thermistor would have at some lower temperature and applied voltage could be fixed at a value sufficiently low so that the power dissipation rating of the thermistor would not be exceeded at said given temperature. In this and other circumstances, that will occur to workers in this art, the shunt resistor may be eliminated. Moreover, it will be obvious that the power dissipation curve of FIG. 4 may be translated along the temperature scale and the scales expanded and contracted by changing the applied voltage and the values of the reactive impedance and shunt resistance.

It should also be noted that it is not material to performance of the system whether the reactive impedance of the system is capacitive reactance or inductive reactance.

Figure 5:
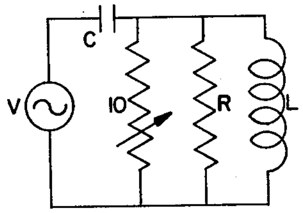
FIG. 5 is a diagram illustrating a modified form of the system of FIG. 2.

The capacitor C in FIG. 2 could be made an inductor, and the capacitor and reactor could be interchanged in FIG. 5 without effecting circuit operation. In FIG. 5 a reactive impedance element of opposite sign is added to the circuit of FIG. 2. In the form shown, an inductor L is connected in parallel with the thermistor 10 and shunt resistor R and this parallel combination is connected in series with capacitor C across the source V.

Addition of the inductor L serves to increase the negative slope of the power curve in FIG. 4. It provides for decrease in power dissipated in a smaller increment of temperature change if that should be desired. As in the case of FIG. 2 the absolute magnitudes of the impedance element C and the parallel circuit are made equal at substantially the temperature at which maximum heating is desired. Current in the inductor varies much as it does in the shunt resistor but the inductor current does not produce heat as the shunt resistor current does.

One very significant advantage of the invention is that it provides heater systems that can be made operative at any temperature and which will operate properly regardless of the temperature of the components at the time the circuitry is first energized. Thus, for example, these systems are entirely operative at the very frigid temperatures at which air, oxygen, and other gases become liquid.

It is to be understood that the foregoing description of embodiments of the invention are not to be taken as limiting the scope of the invention. Various modifications may be made in the systems shown and other embodiments of the invention are possible without departing from the spirit of the invention or the scope of the following claims.

I claim:

1. A heater energizable from an alternating current electrical power source for dissipating as heat a quantity of electrical power which is maximum at a selected temperature and diminishes at successively higher temperatures, comprising a variable impedance element including resistance whose impedance changes materially with temperature change, a reactive impedance element connected in series with said variable impedance element for connection therewith across said source and having an absolute impedance value nearly equal that of said variable impedance element at said selected temperature.

2. The invention defined in claim 1 in which said variable impedance element comprises the parallel circuit combination of a first resistor whose impedance changes materially with temperature change and a second resistor whose impedance does not change materially with temperature change.

3. The invention defined in claim 1 in which a second reactive impedance element, having reactance of opposite sign of that of the first mentioned reactive impedance element, is connected in parallel with said resistive variable impedance element.

References Cited in the file of this patent

UNITED STATES PATENTS

| | | |
|---|---|---|
| 2,021,752 | Suits | Nov. 19, 1935 |
| 2,605,380 | Bauman et al. | July 29, 1952 |

OTHER REFERENCES

Goodyear: Electronic Industries, vol. 17, No. 7, July 1958, pp. 51–55, 118.